(12) United States Patent
Talan et al.

(10) Patent No.: US 8,452,676 B1
(45) Date of Patent: May 28, 2013

(54) METHOD AND SYSTEM FOR FILING A TAX FORM USING QUICK RETURN

(75) Inventors: Jonathan Michael Talan, Frisco, TX (US); Ronald G. Starling, II, San Diego, CA (US); Jonathan Allen Kirkland, The Colony, TX (US); Steven Karl Wheelis, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 323 days.

(21) Appl. No.: 12/844,793

(22) Filed: Jul. 27, 2010

(51) Int. Cl.
*G06F 17/22* (2006.01)

(52) U.S. Cl.
USPC ............ 705/31; 705/19; 705/36 R; 705/36 T; 715/234; 707/700

(58) Field of Classification Search
USPC ................... 705/31, 11, 500; 706/15
See application file for complete search history.

(56) References Cited

U.S. PATENT DOCUMENTS

| | | | | |
|---|---|---|---|---|
| 7,539,635 B1* | 5/2009 | Peak et al. | | 705/31 |
| 7,603,301 B1* | 10/2009 | Regan | | 705/31 |
| 7,716,094 B1* | 5/2010 | Sutter et al. | | 705/31 |
| 8,037,014 B1* | 10/2011 | Perelman et al. | | 707/600 |
| 2004/0083145 A1* | 4/2004 | Kobayashi et al. | | 705/31 |
| 2007/0168274 A1* | 7/2007 | Taylor | | 705/36 T |
| 2012/0109792 A1* | 5/2012 | Eftekhari et al. | | 705/31 |

* cited by examiner

Primary Examiner — Vanel Frenel
(74) Attorney, Agent, or Firm — Osha Liang LLP

(57) ABSTRACT

A method for filing a tax form, comprising generating a basic return form, receiving a plurality of basic return answers to a plurality of basic return questions from a user, obtaining aggregate tax data from a plurality of filed tax returns based on the plurality of basic return answers, determining a plurality of aggregate tax questions based on the aggregate tax data, determining a plurality of utilization levels for the plurality of aggregate tax questions, generating a summary input form comprising a first plurality of tax questions and a second plurality of tax questions, receiving a plurality of summary input answers to the first plurality of tax questions and the second plurality of tax questions from the user, completing the tax form based on the plurality of summary input answers to obtain a completed tax form, and filing the completed tax form with a tax authority.

25 Claims, 9 Drawing Sheets

| Series | Code (ordered by most used) | Number of Hits | Screen | Notes |
|---|---|---|---|---|
| 11 | 800 | 6015 | Wages | A tax return may have multiple W2 tax forms, therefore there are more hits than returns in a data set of 4337 returns. |
| 1 | 1000100004 | 4337 | Client Info | A 1-1 ratio of returns to screen for a data set of 4337 returns. |
| 3 | 14 | 4307 | Bogus, EF Screen | |
| 12 | 800 | 3936 | Interest /Schedule B | |
| 2 | 1000200006 | 2968 | Dependents | |
| 61 | 800 | 2968 | Depreciation | |
| 52 | 800 | 2743 | Schedule D | |
| 5100 | 22 | 2358 | Misc Info | |
| 13 | 800 | 2062 | Dividends | |
| 14 | 800 | 1979 | Pension IRA | 1000 may be the threshold number of hits for screen inclusion as a Quick Return Question |
| 700 | 31 | 668 | Other Credits | Starting to see less significant screens (i.e. it may not be worth having a Quick Return Question based on screens with hits less than the predetermined threshold). |
| 36 | 15 | 658 | Education Credits | |
| 64 | 15 | 657 | Vehicle Expense | |
| 901 | 10 | 110 | California Head of Household | Has a low number of hits in relation to the total data set, however this screen may be included with a large percentage of CA tax returns. |

FIG. 6

METHOD AND SYSTEM FOR FILING A TAX FORM USING QUICK RETURN

BACKGROUND

There are numerous systems used today for filing tax forms. The preparation and filing of tax forms often requires significant effort on the part of a user preparing the tax filing through a tax preparation system. For example, tax preparation systems typically allow users to answer tax questions in an order that is often determined by the order in a tax form, and not in a format that maximizes ease-of-use for the user. Furthermore, tax preparation systems often require a user to go through and/or complete many tax questions that may not be pertinent to the tax filing of that particular individual. Similarly, many tax preparation systems require a user to go through a large number of screens in the preparation of their tax forms. Such a process typically requires the user to spend a large amount of time inputting information into a tax preparation system.

SUMMARY

In general, in one aspect, the invention relates to a method for filing a tax form, comprising generating a basic return form comprising a plurality of basic return questions relating to the tax form, receiving a plurality of basic return answers to the plurality of basic return questions from a user, generating a first plurality of tax questions based on the plurality of basic return answers, obtaining aggregate tax data from a plurality of filed tax returns based on the plurality of basic return answers, determining a plurality of aggregate tax questions based on the aggregate tax data, determining a plurality of utilization levels for the plurality of aggregate tax questions, selecting a portion of the plurality of aggregate tax questions based on the plurality of utilization levels to generate a second plurality of tax questions, generating a summary input form comprising the first plurality of tax questions and the second plurality of tax questions, receiving a plurality of summary input answers to the first plurality of tax questions and the second plurality of tax questions from the user, completing the tax form based on the plurality of summary input answers to obtain a completed tax form, and filing the completed tax form with a tax authority.

In general, in one aspect, the invention relates to a system for filing a tax form, comprising a hardware processor, a basic return form engine executing on the hardware processor and configured to generate a basic return form comprising a plurality of basic return questions relating to the tax form; a user input engine executing on the hardware processor and configured to receive a plurality of basic return answers to the plurality of basic return questions from a user, and receive a plurality of summary input answers to a first plurality of tax questions and a second plurality of tax questions from the user; an extrapolation engine executing on the hardware processor and configured to generate the first plurality of tax questions based on the plurality of basic return answers; a neural network configured to obtain aggregate tax data from a plurality of filed tax returns based on the plurality of basic return answers, determine a plurality of aggregate tax questions based on the aggregate tax data, determine a plurality of utilization levels for the plurality of aggregate tax questions, and select a portion of the plurality of aggregate tax questions based on the plurality of utilization levels to generate the second plurality of tax questions; a summary input form engine executing on the hardware processor and configured to generate a summary input form comprising the first plurality of tax questions and the second plurality of tax questions; a tax form completion engine executing on the hardware processor and configured to complete the tax form based on the plurality of summary input answers to obtain a completed tax form; and a tax form filing engine executing on the hardware processor and configured to file the completed tax form with a tax authority In general, in one aspect, the invention relates to a computer readable medium for storing instruction for filing a tax form, the instructions executable on a hardware processor and comprising functionality for generating a basic return form comprising a plurality of basic return questions relating to the tax form, receiving a plurality of basic return answers to the plurality of basic return questions from a user, generating a first plurality of tax questions based on the plurality of basic return answers, obtaining aggregate tax data from a plurality of filed tax returns based on the plurality of basic return answers, determining a plurality of aggregate tax questions based on the aggregate tax data, determining a plurality of utilization levels for the plurality of aggregate tax questions, selecting a portion of the plurality of aggregate tax questions based on the plurality of utilization levels to generate a second plurality of tax questions, generating a summary input form comprising the first plurality of tax questions and the second plurality of tax questions, receiving a plurality of summary input answers to the first plurality of tax questions and the second plurality of tax questions from the user, completing the tax form based on the plurality of summary input answers to obtain a completed tax form, and filing the completed tax form with a tax authority.

Other aspects of the invention will be apparent from the following description and the appended claims.

BRIEF DESCRIPTION OF DRAWINGS

FIGS. 3, 4A, 4B, 5, 6, and 7 show examples in accordance with one or more embodiments of the invention.

DETAILED DESCRIPTION

Figure 1:
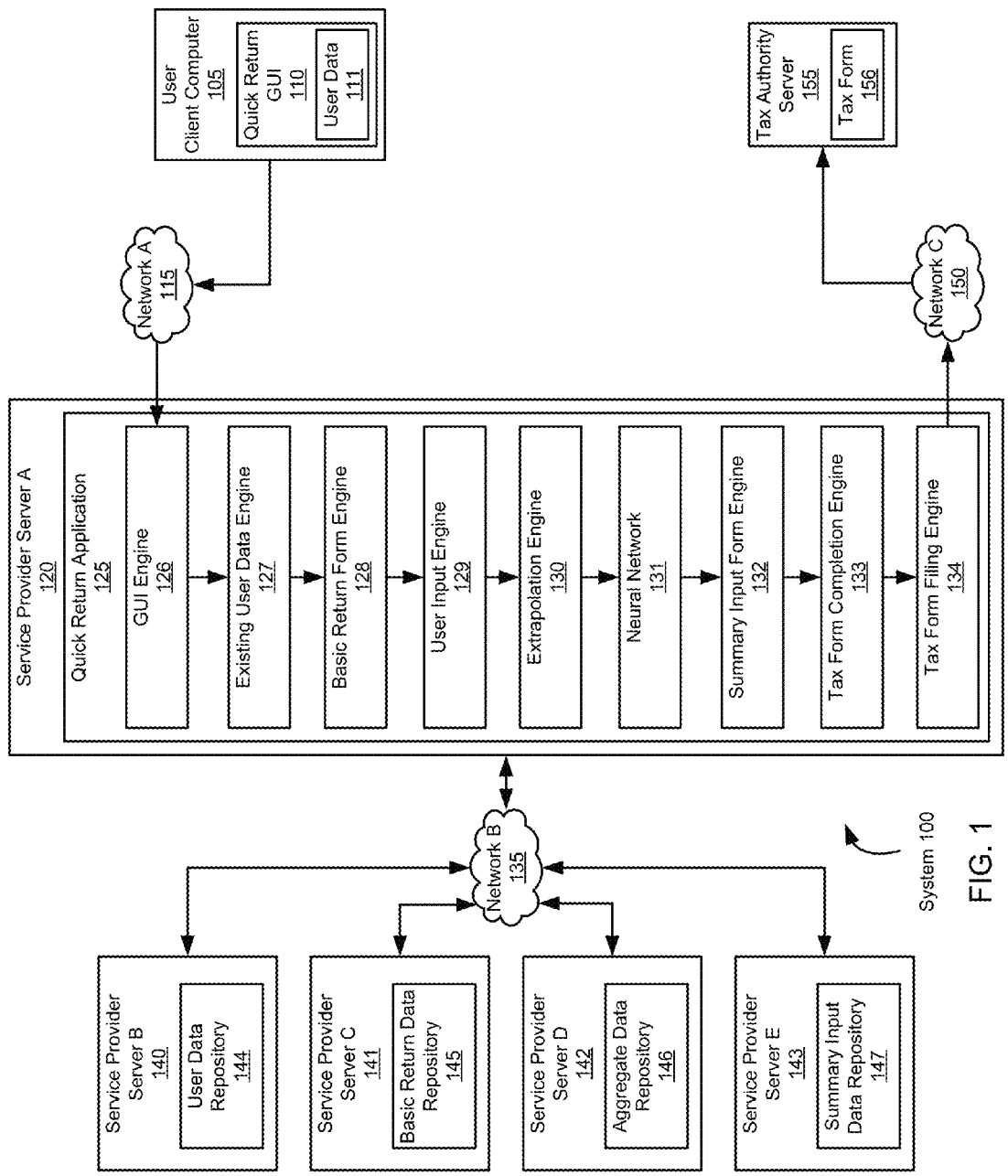
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for filing a tax form. In general, embodiments of the invention provide a system and method for providing a user with a streamlined process of preparing a tax form. In general, embodiments of the invention provide a system and method for using a neural network and aggregate tax data to prepare and file a tax form.

FIG. 1 shows a system (100) in accordance with one or more embodiments of the invention. As shown in FIG. 1, system (100) includes components such as user client computer (105), service provider server A (120), service provider server B (140), service provider server C (141), service provider server D (142), service provider server E (143), and tax authority server (155). Further, service provider server A (102) includes quick return application (125), which includes GUI engine (126), existing user data engine (127), basic return form engine (128), user input engine (129), extrapolation engine (130), neural network (131), summary input form (132), tax form completion engine (133), and tax form filing engine (134). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a Wide Area Network (WAN), a Local Area Network (LAN), etc.), with wired and/or wireless segments. In one or more embodiments of the invention, there may be more than one GUI engine, existing user data engine, basic return form engine, user input engine, extrapolation engine, neural network, summary input form, tax form completion engine, and tax form filing engine running on a device, as well as more than one user client computer, service provider server, and tax authority server interfacing with those components.

In one or more embodiments of the invention, user client computer (105) is configured to display quick return GUI (110) to a user. User client computer (105) may be any computer that acts as a client to service provider server A (120), through, for example, network A (115). Quick return GUI (110) may be a graphical user interface (i.e. GUI) generated by GUI engine (126) that includes user interface elements enabling a user to receive information and provide user input to the GUI. For example, a user may provide user data (111) to quick return GUI (110), which may subsequently be sent over network (115) to quick return application (125). Those skilled in the art will appreciate that there may be various mechanisms through which quick return GUI (110) may be viewed on user client computer (105) by a user.

In one or more embodiments of the invention, service provider server A (120) is configured to host quick return application (125). Service provider server A (120) may be managed, operated, and/or owned by a service provider (e.g. the entity that develops, manages, and/or owns quick return application (125)). Quick return application (125) may include various engines, including GUI engine (126), existing user data engine (127), basic return form engine (128), user input engine (129), extrapolation engine (130), neural network (131), summary input form (132), tax form completion engine (133), and tax form filing engine (134).

In one or more embodiments of the invention, GUI engine (126) is configured to generate GUIs for view and access by users. For example, GUI engine (126) may generate quick return GUI (110) and send quick return GUI (110) over network A (115) to be viewed on user client computer (105). In one or more embodiments of the invention, quick return GUI (110) may display information and/or data associated with quick return application (125). Quick return GUI (110) may be viewed in a web browser, an application window, and the like. Quick return GUI (110) may be viewed in these display technologies by a user of quick return application (125). Quick return GUI (110) may include standard web elements, including video, audio, and text, as well as interface technologies not limited to text submission on forms, voice capture, and user gesture interpretation. In one or more embodiments of the invention there may be various other display technologies used to view Quick return GUI (110).

In one or more embodiments of the invention, existing user data engine (127) is configured to obtain existing user data from a prior year's tax return. Specifically, user data engine (127) may obtain existing user data from a prior year's tax return when such data is available in system (100). Those skilled in the art will appreciate that existing user data may include various types of data relating to a tax return, including but not limited to name, address, social security number (SSN), home phone number, cell phone number, email address, personal income, deductions, credits, number of dependents, businesses income, assets, capital gains, and other information pertinent to tax returns. If such data exists in system (100), then user data engine (127) may obtain this data from user data repository (144). User data repository (144) may be hosted on service provider server B (140). User data engine (127) may access user data repository (144) over network B (135).

In one or more embodiments of the invention, basic return form engine (128) is configured to generate a basic return form. A basic return form may be a form including various questions relating to a specific user's tax liabilities. A tax liability may be the total amount of tax (i.e. a capital amount) that a user is legally obligated to pay to a tax authority as the result of a taxable event occurring. A tax liability may be calculated, for example, by applying an appropriate tax rate to the taxable event's amount (e.g. a capital amount). Taxable events may include a user's personal income for a year, the sale of an asset owned by a user, an amount inherited by a user, and so forth. If existing user data for the specific user is available in system (100), then basic return form engine (128) may generate a basic return form using the existing user data. For example, if user data exists indicating that the user filed a tax return for the prior year including personal income, then basic return form engine (128) may use this information to conclude that the user still has personal income for this year, and may include questions relating to personal income in the basic return form. Alternatively, if the user indicated in a tax return for the prior year that he/she has one dependent, then basic return form engine (128) may use this information to conclude that the user still has dependents, and may include questions pertaining to dependents on the basic return form for the user to address.

In one or more embodiments of the invention, if existing user data for the specific user is not available in system (100), then a basic return form may be generated and provided to the user. In one or embodiments of the invention, the basic return form engine (128) is configured to generate a basic return form based on a generic template. For example, basic return form engine (128) may generate a basic return form using a template including questions about a user's general information, income, deductions, and credits. Basic return form engine (128) may access pre-existing user data stored in user data repository (144), as well as elements relating to the basic return form (e.g. templates, tax questions, user interfaces) stored in basic return data repository (145) over network B (135). Those skilled in the art will appreciate that there may be numerous other ways not disclosed in which a basic return form may be generated by basic return form engine (128).

In one or more embodiments of the invention, user input engine (129) is configured to process user input received through forms generated by quick return application (125). For example, user input engine (129) may process (i.e. receive, modify, format, store) user input to a basic return form, as well as user input to a summary input form. User input engine (129) may process such user input data and store it in user data repository (144) or aggregate data repository (146). In one or more embodiments of the invention, when a user fills out a basic return form or a summary input form, the data provided by the user is sent over network A (115) to quick return application (125), and is processed by user input engine (129), to be stored in user data repository (144). Those skilled in the art will appreciate that there may be various mechanisms by which user input engine (129) may process user input and/or data.

In one or more embodiments of the invention, extrapolation engine (130) is configured to generate tax questions based on received user input. Extrapolation engine (130) may generate tax questions for a summary input form using the answers received from a user in response to tax related questions in a basic return form. For example, if the user provided input indicating that he/she has one dependent on the basic return form in response to a question asking how many dependents the user has, then extrapolation engine (130) may obtain, retrieve, and/or generate tax questions relating to dependents, for use in a summary input form. Tax questions may be generated by extrapolation engine (130) on the basis of information provided and/or excluded from the basic return form by a user. Said another way, extrapolation engine (130) is configured to extrapolate information based on the data provided by a user, and use this extrapolation to determine a set of tax questions to be further provided to the user. Those skilled in the art will appreciate that there may be various other ways not disclosed in which extrapolation engine (130) may generate tax questions based on received user input.

In one or more embodiments of the invention, neural network (131) is configured to process and utilize aggregate tax data to generate tax questions. Aggregate tax data may be any data relating to tax returns and/or forms filed by any number of users over any time period prior to the generation of the basic return form. Aggregate tax data may include, but is not limited to information such as name, address, SSN, home phone number, cell phone number, email address, personal income, deductions, credits, number of dependents, businesses income, assets, capital gains, and any other information pertinent to previously filed tax returns. Aggregate tax data may relate to a large number of tax filers, and is not restrained to the tax data of the user for which the basic return form is generated. Essentially, any previously filed tax returns of any past or present user of system (100) may be stored in aggregate data repository (146), and accessed and/or analyzed to generate tax questions. Therefore, system (100) may have an aggregate tax data pool stored in aggregate data repository (146) that is accessible over network B (135) by quick return application (125), and specifically, neural network (131).

In one or more embodiments of the invention, neural network (131) is an artificial intelligence construct. Artificial intelligence (AI) is a branch of computer science that aims to create and replicate human intelligence in machines.

More specifically, in one or more embodiments of the invention, neural network (113) is made up of interconnecting neurons (i.e. software engineering constructs that mimic the network properties of true biological neurons). Further, neural network (113) may be implemented as one of the following types of neural networks: acyclic (i.e. feed forward) networks (e.g. where a signal passes in only one direction), and recurrent networks (e.g. which allow feedback). In one or more embodiments of the invention, feed forward neural networks use three types of neurons—input neurons, hidden neurons, and output neurons. Input neurons provide input to the network, and hidden neurons perform calculations on the data provided by the input neurons, and propagate data to the output neurons based on those calculations. Output neurons act as an interface between the neural network and the outside environment, and pass on data that has been selected by the neural network.

Neural network (131) is configured to include neurons of various types that process and analyze data from the aggregate tax data pool. The neurons of neural network (131) may include input neurons, hidden neurons, as well as output neurons. The input neurons, part of the input layer of the neural network, may represent tax forms obtained from the aggregate tax data pool (e.g. a W2 tax form, a 1099-Int interest tax form, a 1099-Div income tax form). The hidden neurons, part of the hidden layer of the neural network, may perform calculations on the input provided by the input neurons (e.g. tax forms, tax form data). Once the hidden layer has performed these calculations, the hidden neurons may forward specific tax fields (e.g. tax questions) of the tax forms (e.g. W2, 1099-Int, 1099-Div) to the output layer. Once the output layer receives this data, it may pass it on to the rest of system (100). Those skilled in the art will appreciate that there may be various other types of neural networks not disclosed used to process and analyze data from the aggregate tax data pool.

In one or more embodiments of the invention, summary input form engine (132) is configured to generate a summary input form. A summary input form may be a form including tax questions pertaining to the user that filled out and submitted a basic return form. A summary input form may include various questions relating to a tax form of a user, such as general user and client information, wages and salary, interest income, penalties, direct deposit information, and other miscellaneous information. In preparing the summary input form, summary input form engine (132) may generate tax questions based on the answers received by the user for the basic return form, as well as tax questions generated by neural network (131) based on the aggregate tax data pool. Thus, summary input form engine (132) may access and retrieve data stored on various data repositories, including aggregate data repository (146) and summary input data repository (147). Summary input form engine (132) may access elements relating to the summary input form (e.g. templates, tax questions, user interfaces) stored in summary input data repository (147) over network B (135). Those skilled in the art will appreciate that there may be numerous other ways not disclosed in which a summary input form may be generated by summary input form engine (132).

In one or more embodiments of the invention, tax form completion engine (133) is configured to generate tax forms using the information submitted in the summary input form by a user. For example, if a user submitted information relating to a W2 tax form in a summary input form generated by summary input form engine (132), then tax form completion engine (133) may generate and fill out (i.e. complete) a W2 tax form using such information. Specifically, tax form completion engine (133) may generate the W2 tax form by filling out fields to tax questions on the W2 form with the information as submitted by the user in the summary input form. Numerous tax forms may be generated, filled out, and/or completed by tax form completion engine (133), including but not limited to tax forms relating to income, credits, interest, assets, businesses, depreciation, and other tax categories. Those skilled in the art will appreciate that there may be numerous other ways not disclosed in which a tax form may be generated by tax form completion engine (133).

In one or more embodiments of the invention, tax form filing engine (134) is configured to file tax forms with tax authorities. For example, tax form filing engine (134) may file a tax form (e.g. tax form (156)) created by tax form completion engine (133) (e.g. a W2 tax form) with the Internal Revenue Service (IRS). Tax form filing engine (134) may send tax form (156) to a tax authority (e.g. the IRS) via tax authority server (155) over network C (150) (e.g. the Internet). Tax authority server (155) may be owned, operated, and/or managed by a tax or governmental authority. Tax form (156) may include all of the details submitted to quick return application (125) by a user through a basic return form and a summary input form. Those skilled in the art will appreciate that there may be numerous other ways not disclosed in which a tax form may be filed with a tax authority by tax form filing engine (134).

In one or more embodiments of the invention, quick return application (125) may interact with service provider server B (140), service provider server C (141), service provider server D (142), and service provider server E (143), over network B (135). Service provider server B (140), service provider server C (141), service provider server D (142), and service provider server E (143) may host, manage, and/or store data and data repositories including user data repository (144), basic return data repository (145), aggregate data repository (146), and summary input data repository (147), respectively. In one or more embodiments of the invention, data repositories (144), (145), (146), and (147) may include various data associated with quick return application (125). One or more of the data repositories may be implemented as a relational database configured to store data entries associated with the quick return application (125). Further, one or more data repositories may be implemented as spreadsheets including data cells associated with the quick return application (125). In one or more embodiments of the invention the data repositories (144), (145), (146), and (147) may be implemented using numerous technologies not disclosed.

In one or more embodiments of the invention, service provider server B (140), service provider server C (141), service provider server D (142), and service provider server E (143), and the databases hosted by them, may be accessible by quick return application (125), and any of the elements of quick return application (125), via network B (135). Service provider server B (140), service provider server C (141), service provider server D (142), and service provider server E (143) may be managed, owned, and/or operated by a service provider (e.g. the entity that develops, manages, and/or owns quick return application (125)). Those skilled in the art will appreciate that there may be numerous other service provider servers, and data repositories hosted on such servers beyond those disclosed that interact and are accessible by quick return application (125).

Figure 2:
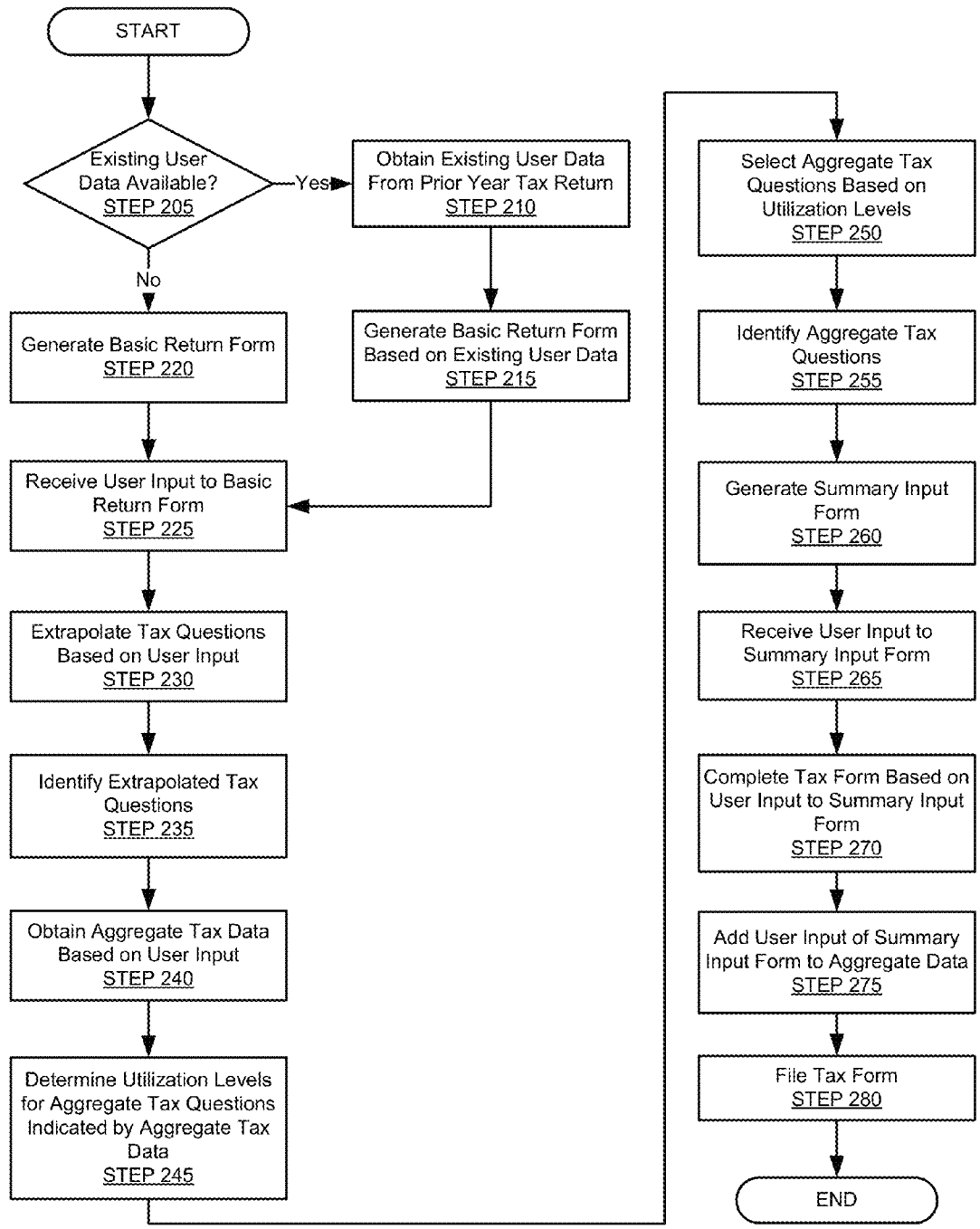
FIG. 2 shows a flowchart in accordance with one or more embodiments of the invention.

FIG. 2 shows a flowchart in accordance with one or more embodiments of the invention. The process shown in FIG. 2 may be used, for example, with system (100), to file a tax form with tax authorities. The sequence of steps shown in FIG. 2 may differ among embodiments of the invention, and one or more of the steps may be performed in parallel and/or may be optional.

In STEP 205, a determination is made about whether existing user data is available. If existing user data is available, then the process proceeds to STEP 210; otherwise, the process proceeds to STEP 220.

In STEP 210, existing user data is obtained from a prior year's tax return. In one or more embodiments of the invention, the existing user data is obtained from user data repository (144).

In STEP 215, a basic return form is generated using the pre-existing user data. Specifically, a basic return form may be generated including tax questions relating to the user data retrieved from tax returns previously filed using system (100) by a user. Therefore, the basic return form may be generated including tax questions pertaining to the mode of filing (e.g. electronic versus postal mail), number of dependents, income (e.g. number of W-2's interest income, dividends, pension income, social security benefits, sale of assets, business income, rental properties, gambling income), deductions (e.g. itemized deductions, adjustments), and credits (e.g. new homebuyer credits, education credits, health savings account, EIC), and other tax related categories. If, for example, the existing user data indicates that the user had two dependents as of last year's tax filing, then the basic return form may be generated to include two dependents as a default (e.g. that are modifiable by the user via a selection mechanism). Similarly, any other tax category may be pre-populated with a default value and/or selection based on the pre-existing user data.

In STEP 220, a basic return form is generated without using pre-existing user data. The basic return form may be generated using a template stored in basic return data repository (145). The basic return form may be populated with many of the same basic tax questions as if it had been based on pre-existing user data, including mode of filing, number of dependents, income, deductions, and credits, as well as other tax related categories. Because the basic return form may be based on a basic return form template instead of pre-existing user data, the basic return form may not be pre-populated with defaults based on pre-existing user data as described in STEP 215.

In STEP 225, user input to the basic return form is received. For example, a user may make selections to each of the tax questions on the basic return form, and those selections may be considered to be user input. Examples of user input may include the selection of checkboxes (e.g. as responses to questions asking if the user would like to file electronically, if the user has social security benefits, has performed sale of assets, has incurred vehicle expenses, has used his/her home for business, or has any itemized deductions, adjustments, or credits to declare), selections of numbers in selection boxes (e.g. to identify a number of dependents, number of W2s, interest income, dividends, pension income, business income, rental property income, or gambling income), entry of text in text boxes, selection of radio buttons, and other user input mechanisms.

In STEP 230, tax questions are extrapolated (i.e. generated) based on the user input. For example, if the user input indicates that the user has interest income, then tax questions may obtained, retrieved, generated, and/or extrapolated that relate to interest income (e.g. name of payer, tax form 1099-Int details, and the like) for use in a summary input form. The tax questions may be generated based on existing tax questions in a data repository, obtained from tax forms of the current tax filing period. For instance, there may be a data repository (e.g. data repository A) that includes every single tax question from every single tax form in existence for the current tax year. The extrapolation of tax questions may include the identification of the appropriate tax questions in data repository A, the extraction of those relevant and appropriate tax questions from data repository A, the formatting of such tax questions after extraction, the ordering of such tax questions, and so forth. Those skilled in the art will appreciate that there may be many ways by which tax questions may be extrapolated.

In STEP 235, the extrapolated tax questions are identified. These tax questions may be identified and/or monitored via a list maintained by quick return application (125), in a data repository, or by another mechanism. For example, if tax questions relating to interest income are extrapolated in STEP 230, then these interest income questions may be identified and added to a list that is later used to populate the summary input form. The tax questions may later be added to the summary input form according to the tax form (e.g. ordered by the tax form type), alphabetically, accordingly to the tax category, in collapsed form, in expanded form, and various other ways. Alternatively, the identified extrapolated tax questions may be added to a preliminary summary input form. A preliminary summary input form is a preliminary version of a summary input form, and may be modified and used as a basis for generating the final version of the summary input form.

In STEP 240, aggregate tax data is obtained based on the user input. Aggregate tax data is tax forms, and tax questions in those tax forms, that have been previously filed and are stored in the system. Specifically, a portion of this aggregate tax data may be identified and obtained by identifying the tax questions and/or tax forms that include key words relating to information that the user provided in the basic return form. Aggregate tax data may, for example, include contact information, personal income, deductions, credits, number of dependents, businesses income, assets, capital gains, and any other information pertinent to previously filed tax returns of a large number of tax filers. Aggregate tax data may also be referred to as an aggregate tax data pool of system (100). For example, aggregate tax data may be retrieved that relates to dependents, because the user submitted user input to the basic return form indicating that he/she has one dependent. In this case, the entire data pool of aggregate data may be searched for those entries associated with tax forms including dependent information. Once those tax forms, and the corresponding data they contain, are retrieved, the tax questions in them (and the forms themselves) may be ranked according to utilization levels.

In STEP 245, utilization levels for aggregate tax questions indicated by the aggregate tax data are determined. Aggregate tax questions are questions in the tax forms that are part of the aggregate tax data. The utilization levels for the aggregate tax questions may either be pre-calculated, or may be calculated once the aggregate tax questions are identified. Utilization levels may indicate an absolute ranking about the utilization of tax questions and/or tax forms. For example, for the entire set of tax forms associated with dependents that are identified by searching through the aggregate tax data pool in STEP 240, a number of hits may be determined. The number of hits may indicate the number of forms of that type that were previously filed. A ranking, or utilization level, may be determined for that type of tax form, and the specific questions in that tax form, according to how many tax returns were filed for the year that the tax form in question was filed. In such cases, utilization levels may be applied to specific years. In one or more embodiments of the invention, if there were a total number X (e.g. 1000) of tax returns filed in 2009, and there were a total number Y (e.g. 200) of tax forms relating to dependents filed in 2009, then a utilization level of Y/X (e.g. 200/1000=1/5) may be calculated for those tax forms relating to dependents. Similarly, utilization levels may be assigned to individual questions of a specific tax form. For example, for a set of questions in a tax form relating to dependents, each question may be ranked according to how many times it was answered and filed out of the larger pool of questions in that tax form, because not all questions on every tax form are required to be answered. Specifically, if there were 100 first questions (e.g. question 1) that were answered out of 200 forms with that question (e.g. form A), then the utilization level for that question (e.g. question 1 of form A) may be ½. This may indicate that there is approximately a 50% answer rate for question 1 in form A. Those skilled in the art will appreciate that there may be various other schemes for calculating a utilization level for a tax form and/or a tax question.

In STEP 250, aggregate tax questions are selected based on the utilization levels exceeding pre-determined utilization threshold levels. After obtaining the pre-determined utilization threshold levels, neural network (131) may select the aggregate tax questions with utilization levels that exceed the pre-determined threshold levels. In other words, a calculation is performed that compares a utilization level of a tax question with its pre-determined utilization threshold level, and selects the question for future use if the utilization level of the tax question exceeds the utilization threshold level of the tax question. This concept may also apply to tax forms. Therefore, for a tax form, a calculation is performed that compares a utilization level of the tax form with its pre-determined utilization threshold level, and selects the tax form (i.e. and all of the tax questions in the tax form) for future use if the utilization level of the tax form exceeds the utilization threshold level of the tax form. For example, if question 1 of form A has a utilization level of 50%, and the threshold level for that question is 40%, then question 1 may be selected for inclusion in the summary input form. Similarly, if form A has a utilization level of 20%, and the threshold level for form A is 19%, then the questions from form A may be selected for inclusion in the summary input form. Alternatively, if a question has a utilization level of 30%, and the threshold level for that question has been determined to be 60%, then that question may not be selected for inclusion in the summary input form. Please refer to the description of FIG. 7 for more details about how neural network (131) functions.

In STEP 255, the aggregate tax questions that have been successfully selected are identified. The aggregate tax questions may be identified and/or monitored via a list maintained by quick return application (125), a data repository, or by another mechanism. For example if aggregate tax questions relating to dependents are selected, then these dependent questions may be identified and added to a list that is later used to populate the summary input form. These tax questions may later be added to the summary input form along with the previously added extrapolated tax questions. Alternatively, the identified aggregate tax questions may also be added to a preliminary summary input form.

In STEP 260, the summary input form is generated. Specifically, a summary input form may be generated including the identified extrapolated tax questions as well as the identified aggregate tax questions. The summary input form may be generated based on the identified extrapolated tax questions and identified aggregate tax questions contained in a preliminary summary input form. Accordingly, the summary input form (e.g. summary input form A) may including tax questions pertaining to dependents (e.g. names, ages, home addresses, work status, and the like), interest income (e.g. name of payer, tax form 1099-Int details such as bank name, bank account number, bank account period, and the like), client information (e.g. name, address, age, contact information), wages, salaries, and tips, penalties and income (e.g. tax liability for an underpayment penalty), and miscellaneous (e.g. direct deposit information including name, financial institution, routing transit number, depositor account number, type of account, and the like). The summary input form may also include numerous other tax questions that are not part of the identified extrapolated tax questions set or the identified aggregate tax questions set. The inclusion of such questions may be based on previous user history and aggregate data, and may result in the summary input form being more pertinent and directed to the needs of a specific user, as well as producing a faster process from the start to finish of filing a tax return.

In STEP 265, user input to the summary form is received, after the summary input form is displayed to a user through a GUI. User input to the summary input form may be received via various mechanisms, including text entered by the user in text boxes, selection of checkboxes, selection of radio buttons, and various other means. For example, for summary input form A, user input may be received for the following questions—dependents (e.g. names—"Fred Smith", age—"18", home address—"458 Ocean Drive, Redondo Beach, Calif., 90277", work status—"student"), interest income (e.g. name of payer—"Bank of the World", bank name—"Bank of the World", bank account number—"12345678990013", bank account period—"Jun. 1, 2010-Sep. 1, 2010"), client information (e.g. name—"Caesar Smith", address—"458 Ocean Drive, Redondo Beach, Calif., 90277", age—"41", contact information—"caesar.smith@great-email-provider.com"), wages (e.g. $250,000), salaries (e.g. $50,000), and tips (e.g. $0), penalties and income (e.g. tax liability for an underpayment penalty—"$0"), and miscellaneous (e.g. direct deposit information including name "Caesar Smith", financial institution—"Bank of the World", routing transit number—"123456789", depositor account number—"123409746582", type of account—"checking"). Once user input is received (e.g. by user input engine (129)) for the summary input form, it may be processed by the quick return application (125). Those skilled in the art will appreciate that various modification, filtering, formatting, and other processing may occur on the data received as user input.

In STEP 270, a tax form is (or multiple tax forms are) completed based on the user input to the summary input form. The tax forms may be of various types, such as W2, 1099-Int, and 1099-Div. The tax forms may be prepared by tax form completion engine (133). For example, based on the user input received from summary input form A, multiple tax forms relating to penalties, interest, wages, salary, and interest income may be filled. Specifically, each pertinent tax question in these forms may be filled out with the appropriate answer taken from the user input to summary input form A. Each of these forms may be generated in electronic form (i.e. as a file) and/or in physical form (i.e. printed), after which they may be provided to the user that completed summary input form A. Those skilled in the art will appreciate that there may be various means not disclosed by which tax forms are completed using the user input received in STEP 265.

In STEP 275, the user input and completed tax form(s) are added to the aggregate tax data pool. This step may be performed by neural network (131). For example, because the tax forms prepared in STEP 270 are to be filed, the neural network may enrich the aggregate tax data pool with the data held in the tax forms that are to be filed. This may be accomplished, for example, by adding the completed tax forms, as well as the data contained in the completed tax forms, to a data repository containing the aggregate tax data pool. After this addition, the aggregate tax data pool will contain the completed tax forms and the data of the completed tax forms. Subsequently, this new data may be ordered, arranged, formatted, and/or otherwise modified within the aggregate tax data pool. This data may allow the aggregate data pool to become larger and more effective over time, and as multiple sets of new data are added to the aggregate tax data pool, the neural network may become more adept at identifying tax questions that are pertinent to a specific user. This concept is aligned with the neural network approach, in which a system learns to become more efficient over time and with better data sets. In one or more embodiments of the invention, a portion of the user input and the completed tax form(s) may not be added to the aggregate tax data pool, depending on factors determined by system (100). Those skilled in the art will appreciate that there may be various ways not disclosed by which new data is introduced to the aggregate data pool.

In STEP 280, the tax form is (or multiple tax forms are) filed with a tax authority. The tax form may be filed by tax form filing engine (134) with, for example, the IRS over a network or via postal service. Once the tax forms are filed with a tax authority, system (100) may request a receipt of the tax filing. The tax forms may be also filed according to a special status and/or request (e.g. expedited delivery). Those skilled in the art will appreciate that there may be various mechanisms by which tax forms may be filed with a tax authority.

Figure 3:
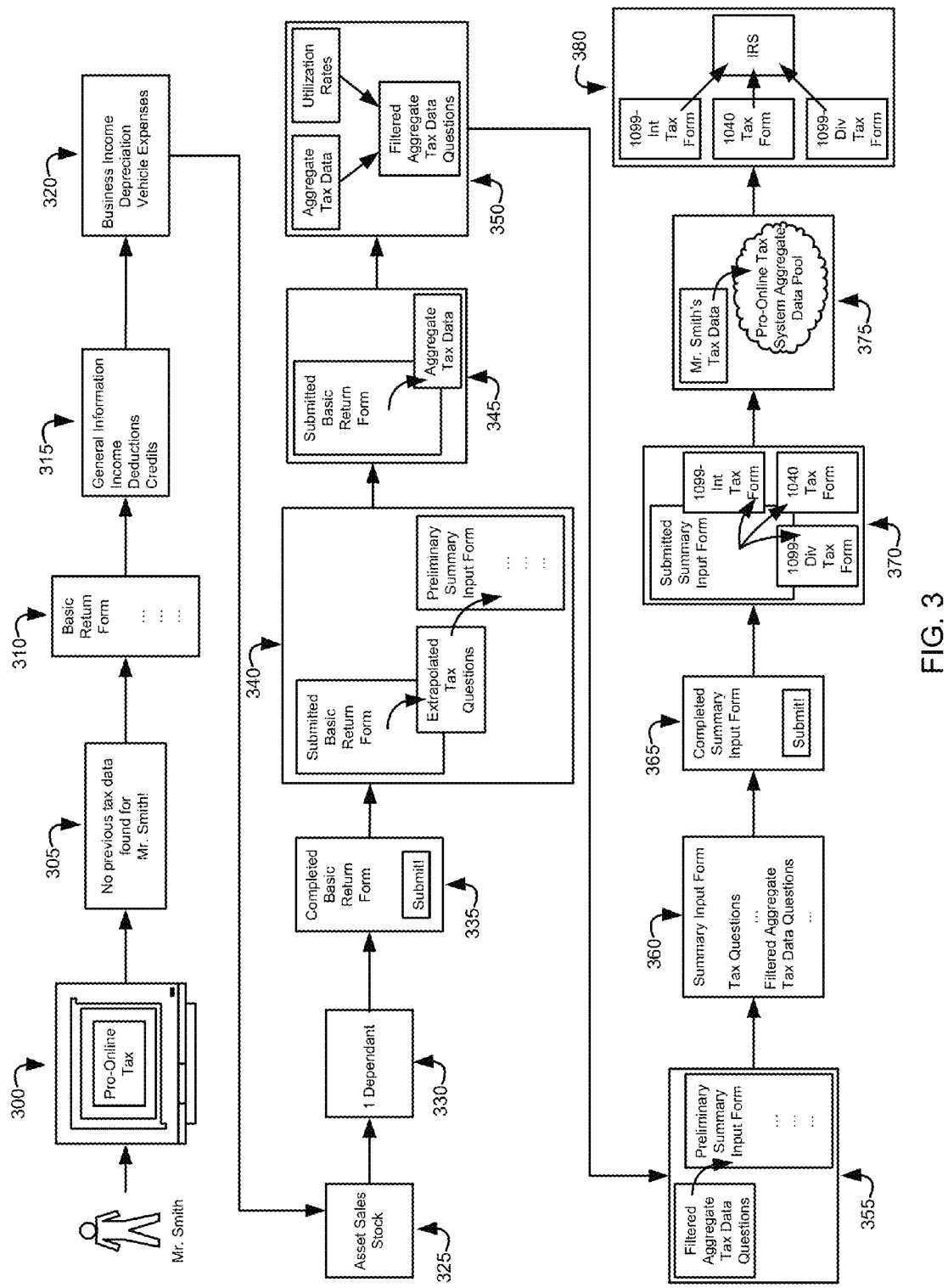

FIG. 3 shows an example in accordance with one or more embodiments of the invention. The process shown in FIG. 3 may be used, for example, with system (100), to file a tax form. The sequence of steps shown in FIG. 3 may differ among embodiments of the invention, and one or more of the steps may be optional.

In portion 300 of FIG. 3, Mr. Smith owns a real estate company. Mr. Smith wants to file his taxes as quickly and efficiently as possible. Mr. Smith logs into the Pro-Online Tax system (POT) on his computer at his office. In one or more embodiment of the invention, Pro-Online Tax is the quick return application described above. When Mr. Smith logs onto Pro-Online Tax on his computer, he may access content through a client (e.g. his computer) that is hosted on another server, over the Internet.

In portion 305, the Pro-Online Tax system determines that Mr. Smith has not filed taxes using POT before, so POT has no tax data for Mr. Smith's tax filings from a prior year. The Pro-Online Tax system may display this information to Mr. Smith. For example, Pro-Online Tax may display a message the following message to Mr. Smith via the GUI: "Mr. Smith, you do not have any pre-existing data in Pro-Online Tax, so a new basic return form will be generated for you to complete."

In portion 310, the Pro-Online Tax system displays to Mr. Smith a basic return form (BRF) to gather tax data points. The BRF may be presented through the GUI of the Pro-Online Tax system in a single page. Because there is no existing data for Mr. Smith, the BRF may be based on a pre-existing template stored in the Pro-Online Tax system. For example, the pre-existing template may include various tax questions including mode of filing (e.g. electronic versus postal mail), number of dependents, income (e.g. number of W2s interest income, dividends, pension income, social security benefits, sale of assets, business income, rental properties, gambling income), deductions (e.g. itemized deductions, adjustments), and credits (e.g. new homebuyer credits, education credits, health savings account, EIC), as well as other tax related categories.

In portion 315, Mr. Smith makes selections in the BRF regarding General Information, Income, Deductions, and Credits. Specifically, Mr. Smith provides input for a variety of questions including mode of filing (e.g. electronic), income (e.g. number of W-2's—"1", interest income—"3", dividends—"1", pension income—"0", social security benefits—"no", business income—"1", rental properties—"0", gambling income—"0"), deductions (e.g. itemized deductions—"no", adjustments—"no"), and credits (e.g. new homebuyer credits—"no", education credits—"no", health savings account—"no", EIC—"no"). Those skilled in the art will appreciate that a "1" and "yes" or selection of a radio box, checkbox, or other UI element may represent true, while a "0", "no", or non-selection of a radio box, checkbox, or other UI element may represent false. Each affirmative selection by Mr. Smith may indicate to the Pro-Online Tax system that tax forms relating to those selections will need to be completed and filed for Mr. Smith.

In portion 320, Mr. Smith indicates that he has business income relating to depreciation of real estate assets and vehicle expenses by selecting buttons in the BRF. Specifically, Mr. Smith may select checkboxes next to sub-items marked "real estate assets" and "vehicle expenses" populated in the GUI underneath the business income portion. The selection of business income relating to depreciation of real estate assets and vehicle expenses by Mr. Smith in the BRF may indicate to the Pro-Online Tax system that tax forms relating to business income, depreciation of real estate assets, and vehicle expenses will need to be completed and filed for Mr. Smith.

In portion 325, Mr. Smith indicates that he sold stock in the current tax year by selecting a sale of assets button in the BRF. Specifically, Mr. Smith may check a button next to the sub-item marked "stock sale" populated in the GUI underneath the income portion. The selection of "stock sale" by Mr. Smith in the BRF may indicate to the Pro-Online Tax system that tax forms relating to the sale of stocks (e.g. short term and/or long term capital gains) will need to be completed and filed for Mr. Smith.

In portion 330, Mr. Smith indicates that he has a child by selecting 1 dependant in the BRF. Specifically, Mr. Smith may indicate "1" in a numerical selection element next to the sub-item marked "number of dependents" populated in the GUI underneath the general information portion. The selection of a dependent by Mr. Smith in the BRF may indicate to the Pro-Online Tax system that tax forms relating to dependents will need to be completed and filed for Mr. Smith.

In portion 335, Mr. Smith submits the BRF. Submitting the BRF may be accomplished by Mr. Smith selecting a "submit" or "OK" button on the BRF, after he has filled out the form. Submitting the BRF may send the selections and data provided by Mr. Smith to the Pro-Online Tax system for further processing and/or manipulation.

In portion 340, POT analyzes Mr. Smith's submitted BRF, and extrapolates tax questions to ask Mr. Smith based on his selections in the BRF. For example, because Mr. Smith indicated that he has 1 dependent, the Pro-Online Tax system may provide Mr. Smith with tax questions relating to dependent child expenses. The Pro-Online Tax system may then add the extrapolated tax questions to a preliminary summary input form (PSIF). The extrapolated tax questions may be retrieved from a database of tax questions in the Pro-Online Tax system. For example, because Mr. Smith indicated that he has 1 dependent, the Pro-Online Tax system may identify those forms in the database that include tax questions relating to dependents (e.g. name of dependent, age of dependent, income of dependent), and add those questions to the PSIF. This may be performed using pattern matching, search technology, and/or other technologies used for extrapolation.

In portion 345, the Pro-Online Tax system searches for and obtains aggregate tax data in the POT system relating to Mr. Smith's BRF input. As described above, aggregate tax data is data from previously filed tax returns that are stored in the system. For example, because Mr. Smith indicated that he sold stock, the Pro-Online Tax system will obtain aggregate tax data relating to capital gains taxes for stock sales. In one or more embodiments of the invention, the Pro-Online Tax system includes an aggregate tax data pool including tax forms filed by previous users of the Pro-Online Tax system, as well as the tax questions in those tax forms, and the answers to those questions provided by the tax filers. For example, because Mr. Smith indicated that he has 1 dependent, the Pro-Online Tax system may search through the aggregate tax data pool for forms, questions, and answers relating to dependents.

In portion 350, the Pro-Online Tax system analyzes the retrieved aggregate tax data and filters the retrieved aggregate tax data according to utilization rates. The filtering of retrieved aggregate tax data may be accomplished by extracting those questions that have utilization rates that exceed their respective utilization rate thresholds. For example, if tax questions 1-6 on a tax form relating to dependents (e.g. form A) were answered and filed by 95% of tax filers in the past using the Pro-Online Tax system, and tax questions 7-10 were answered and filed by 10% of tax filers in the past using the Pro-Online Tax system, and the utilization rate threshold level for the tax questions on form A is 75%, only tax questions 1-6 will be extracted and/or selected and eventually displayed to Mr. Smith in the summary input form (SIF). Accordingly, this selected aggregate tax data is filtered from the retrieved aggregate tax data to produce a set of aggregate tax data questions for use in a PSIF (also referred to as filtered aggregate tax data questions).

In portion 355, the Pro-Online Tax system adds the aggregate tax data questions that have been filtered to a preliminary summary input form. For example, the tax questions 1-6 from form A may be added to a preliminary summary input form that also includes the extrapolated tax questions. These tax questions may be further processed, organized, formatted, and/or modified before the preliminary summary input form is presented to Mr. Smith as a summary input form.

In portion 360, the summary input form is generated by Pro-Online Tax system and displayed to Mr. Smith via the GUI. The summary input form may be generated based on the PSIF. The SIF displays a single summary page of tax questions based on the input Mr. Smith provided in the BRF, as well as the filtered aggregate tax data questions. For example, the SIF may include tax questions 1-6 from form A (as they were filtered from aggregate tax data pertaining to Mr. Smith's earlier inputs to the BRF), as well as the extrapolated tax questions. For instance, the SIF may include tax questions including those relating to general information (e.g. name, address, age, telephone number, email address), dependents (e.g. name of dependent, age of dependent, home address, work status), sale of stocks (e.g. short term capital gains, short term instruments, long term capital gains, long term instruments), depreciation (e.g. amount, property location, property value, amount of time property owned/managed), vehicle expenses (e.g. vehicle make, vehicle model, vehicle year, vehicle identification number, amount), direct deposit information (e.g. financial institution name, routing transit number, depository account number, type of bank account), penalties (e.g. 2008 tax liability), wages (e.g. amount, employer, employment date), interest income (e.g. name of payer, bank name, bank account number, bank account period), and dividends (e.g. total dividends, foreign tax paid, payer). Those skilled in the art will appreciate that the questions on the summary input form may relate to the answers provided by Mr. Smith in the basic return form, and may include various other tax questions not described.

In portion 365, Mr. Smith fills out the SIF with answers to the tax questions, and completes (e.g. submits) the SIF. For example, Mr. Smith may complete the SIF with the following answers—general information (e.g. name—"Caesar Smith", address—"458 Ocean Drive, Redondo Beach, Calif., 90277", age—"41", telephone number—"612.567.3798", email address—"caesar.smith@great-email-provider.com"), dependents (e.g. names—"Fred Smith", age—"18", home address—"458 Ocean Drive, Redondo Beach, Calif., 90277", work status—"student"), sale of stocks (e.g. short term capital gains—"$410,000", short term instruments—"derivatives", long term capital gains—"$50,000", long term instruments—"equity"), depreciation (e.g. amount—"$20,000", property location—"615 Collins Avenue, Miami, Fla., 33139", property value—"$1,200,000", amount of time property owned/managed—"1 year"), vehicle expenses (e.g. vehicle make—"Qexis", vehicle model—"LFB", vehicle year—"2010", vehicle identification number—"123456A73TR1", amount—"$529,000"), direct deposit information (e.g. financial institution name—"Bank of the World", routing transit number—"123456789", depository account number—"12345678990013", type of bank account—"checking"), penalties (e.g. 2008 tax liability—"$5,000"), and wages (e.g. amount—"$250,000", employer—"Big Company A", employment date—"Jan. 1, 2010"), interest income (e.g. name of payer—"Bank of the World", bank name—"Bank of the World", bank account number—"12345678990013", bank account period—"Jun. 1, 2010-Sep. 1, 2010"), and dividends (e.g. total dividends—"$15,999", foreign tax paid—"$0", payer—"Investment Fund A"). Those skilled in the art will appreciate that there may numerous other tax questions that have not been described that Mr. Smith may complete in the summary input form.

In portion 370, tax forms relating to the tax questions displayed to Mr. Smith in the summary input form are completed, based on Mr. Smith's answers to the tax questions in the SIF. For example, because Mr. Smith submitted data relating to interest, dividends, and capital gains, tax forms relating to these tax categories (e.g. tax forms 1099-Int, 1099-Div, and 1040) may be generated by the Pro-Online Tax system and completed using the data provided by Mr. Smith in the summary input form.

In portion 375, Mr. Smith's tax data is added to the pool of aggregate tax data in the POT system. This way, the Pro-Online Tax system learns and becomes more accurate and efficient over time. For example, all of the data provided by Mr. Smith may be added and/or categorized within a database that includes the aggregate tax data pool for future use by the Pro-Online Tax system.

In portion 380, the Pro-Online Tax system files Mr. Smith's completed tax forms with the IRS. For example, each of the 1099-Int, 1040, and 1099-Div tax forms may be filed with the IRS (or other tax authority) via electronic or postal means. Those skilled in the art will appreciate that there may be numerous tax forms filed with the IRS by the Pro-Online Tax system.

Figure 4A:
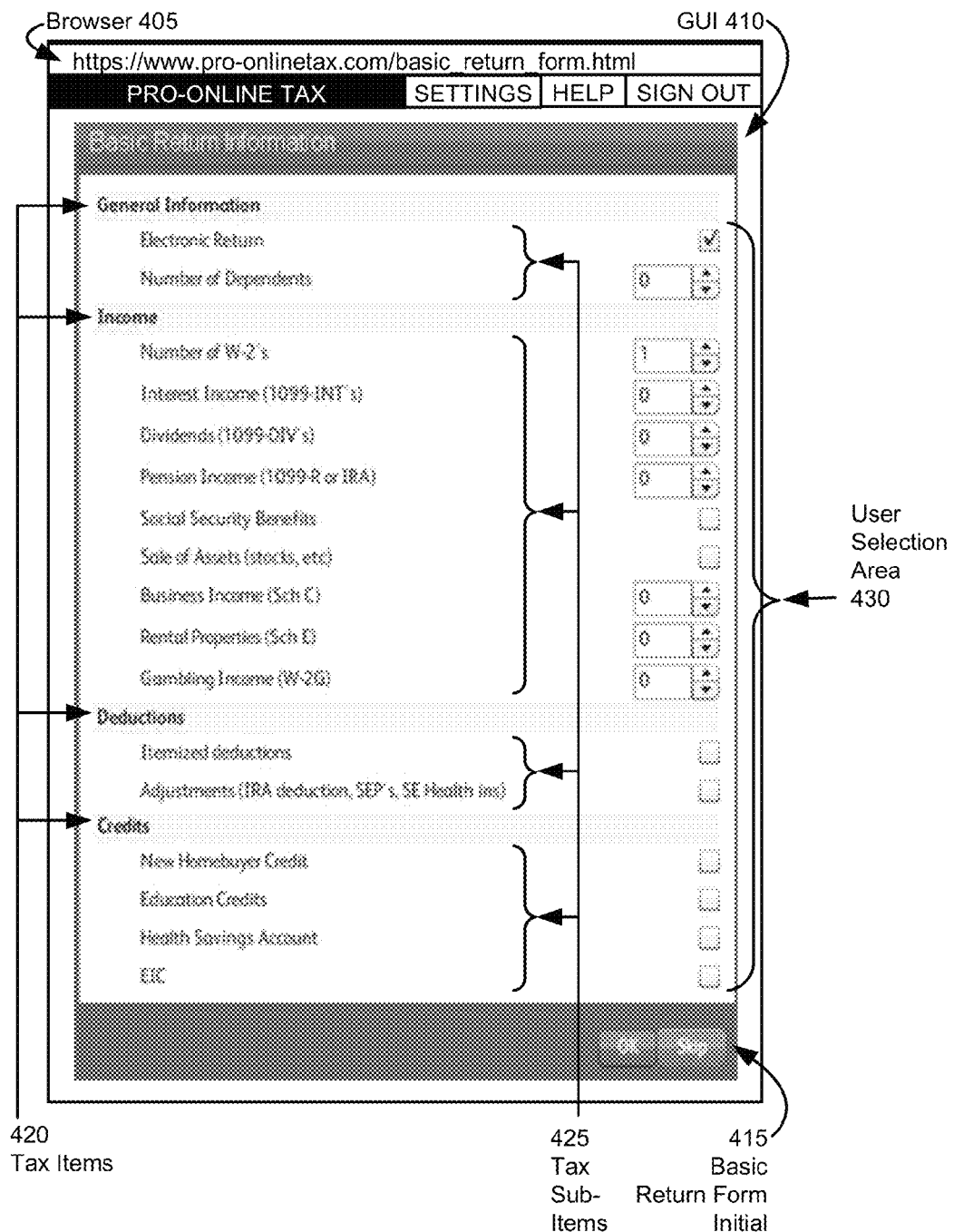

FIG. 4A shows an example in accordance with one or more embodiments of the invention. The example basic return form shown in FIG. 4A may be used, for example, with system (100), to gather user tax information. The elements shown in FIG. 4A may differ among embodiments of the invention, and one or more of the elements may be optional.

In one or more embodiments of the invention, a basic return form (e.g. basic return form initial (415)) may be viewed in browser (405). Browser (405) may reference a specific universal resource locator (URL) pointing to the basic return form html document (e.g. https://www.pro-onlinetax.com/basic_return_form.html). The URL to the basic return form may be encoded and/or encrypted as a security precaution. The basic return form may be viewed in GUI (410), which may include various UI elements. For example, the GUI may contain the basic return form, as well as other links such as "settings", "help", and "sign out". A "settings" link may redirect the GUI to another web page displaying various settings (e.g. username, password, GUI format, security, and the like) of the Pro-Online Tax system. A "help" link may redirect the GUI to another web page displaying various help topics of the Pro-Online Tax system. A "sign out" link may securely sign the user out of the Pro-Online Tax system.

In one or more embodiments of the invention, basic return form initial (415) may include tax items (420), tax sub-items (425), and user selection area (430). Tax items (420) may include tax categories of various types including general information, income, deductions, and credits. These tax categories may include many sub-categories, referred to as tax sub-items (420). For example, the tax item "general information" may include the tax sub-items "electronic return" and "number of dependents". The "income" tax item may include tax sub-items including "number of W2s", "interest income (1099-INTs)", "dividends (1099-DIVs)", "pension income (1099-R or IRA)", "social security benefits", "sale of assets (stocks, etc)", "business income (Sch C)", "rental properties (Sch E)", and "gambling income (W-2G)". Those skilled in the art will appreciate that the tax sub-items with parenthesis "( )" may enclose the name of tax forms relating to that tax sub-item. Tax items may be tax categories that a user may address by completing the basic return form. Those skilled in the art will appreciate that there may be various other tax items and tax sub-items in a basic return form that have not been disclosed.

In one or more embodiments of the invention, user selection area (430) may include various GUI elements that allow a user to provide input in response to the tax items and tax sub-items. For example, user selection area (430) may include checkboxes, selections of numbers in selection boxes, entry of text in text boxes, selection of radio buttons, and various other user input mechanisms. For example, a user may check a checkbox next to the tax sub-item "electronic return" under tax item "general information" to indicate that he/she intends on filing tax returns electronically. Similarly, a user may input a number "1" into a numeric selection element next to the tax sub-item "number of dependents" under the "general information" tax item to indicate that he/she has 1 dependent. Those skilled in the art will appreciate that there may be various UI elements used in user selection area (430) that have not been described. When a user has completed basic return form initial (415) (i.e. made selections for all elements in user selection area (430) that are pertinent to his/her tax filing), the user may then submit the basic return form by clicking on the "OK" button (e.g. in the bottom right hand corner of the basic return form). Similarly, if the user wishes to skip the basic return form screen, then the user may click on the "Skip" button (e.g. in the bottom right hand corner of the basic return form next to the "OK" button). Those skilled in the art will appreciate that the basic return form may include other components not described.

Figure 4B:
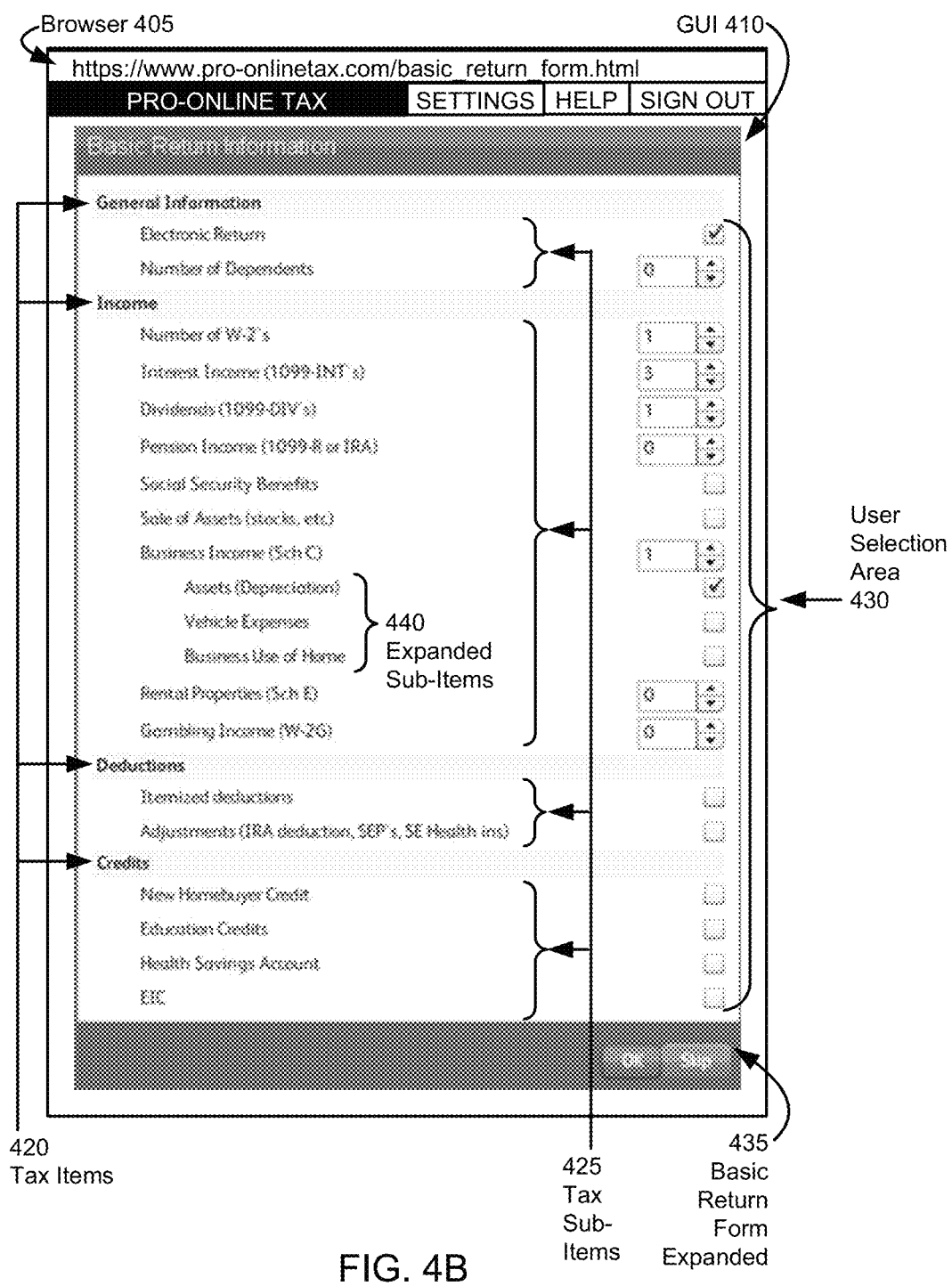

FIG. 4B shows an example in accordance with one or more embodiments of the invention. The example basic return form shown in FIG. 4B may be used, for example, with system (100), to gather user tax information. The elements shown in FIG. 4B may differ among embodiments of the invention, and one or more of the elements may be optional.

In one or more embodiments of the invention, FIG. 4B shows an expanded version of the basic return form shown in FIG. 4A. Specifically, expanded sub-items (440) in basic return form expanded (435) are shown. Expanded sub-items (440) may be sub-items that have been expanded due to a selection made by a user. For example, because a user made a selection of "1" for the tax sub-item "business income (Sch C)", the expanded sub-items "assets (depreciation)", "vehicle expenses", and "business use of home" may be displayed.

Expanded sub-items (440) may represent further sub-categories of tax questions presented to a user to answer. Expanded sub-items (440) may also include UI elements displayed next to them in user selection area (430) as selection mechanisms. Those skilled in the art will appreciate that expanded sub-items (440) may be displayed immediately after a user makes a selection in user selection area (430), through the use of various webpage technologies (e.g. dynamic scripting, asynchronous JavaScript™, extensible markup language (XML), cached content, and the like). In other words, as soon as a user makes a selection in user selection area (430), expanded sub-items (440) may appear in basic return form expanded (435). Those skilled in the art will appreciate that there may be numerous other functionalities enabled in basic return form expanded (435) by expanded sub-items that have not been disclosed.

Figure 5:
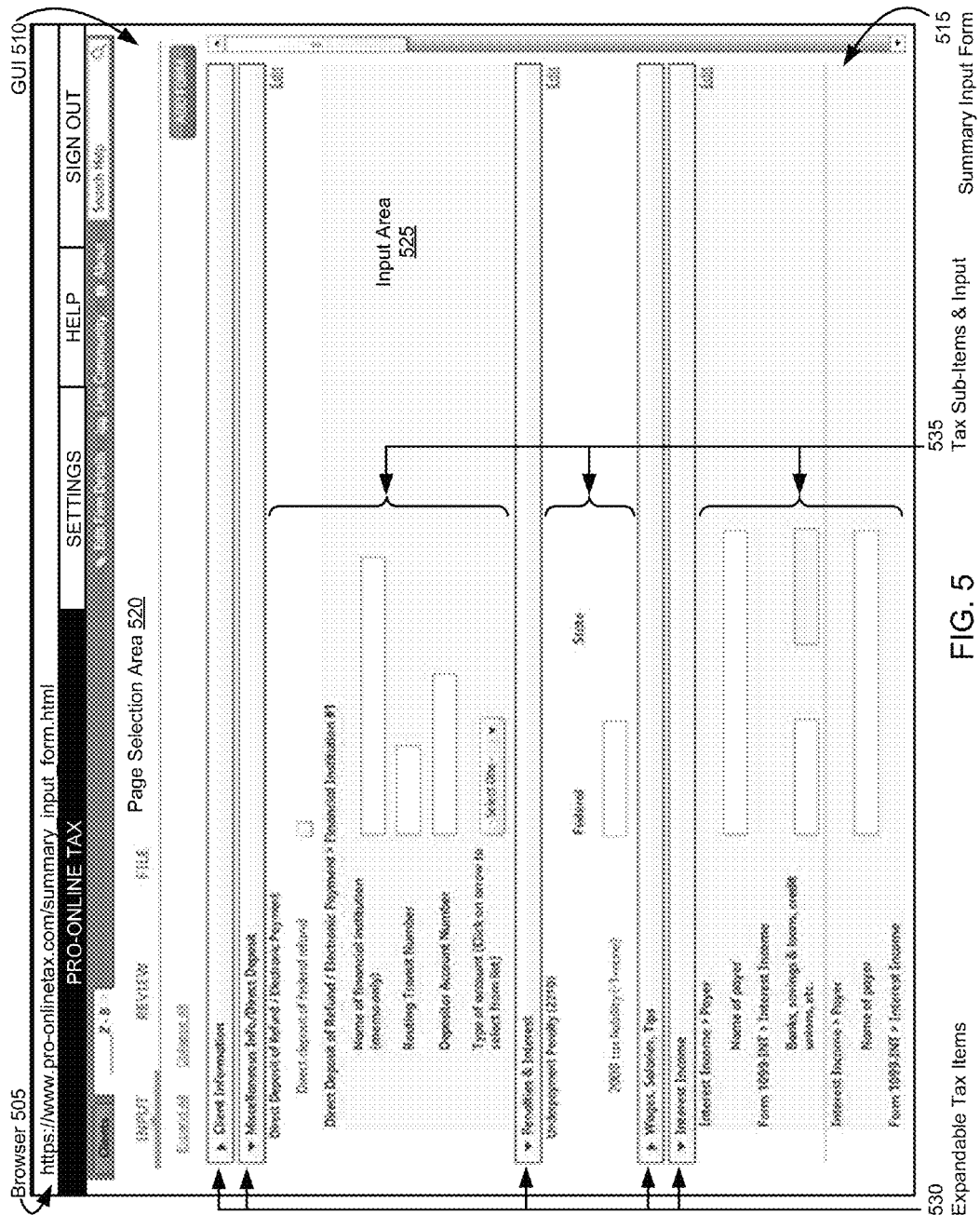

FIG. 5 shows an example in accordance with one or more embodiments of the invention. The example summary input form shown in FIG. 5 may be used, for example, with system (100), to gather user tax information. The elements shown in FIG. 5 may differ among embodiments of the invention, and one or more of the elements may be optional.

In one or more embodiments of the invention, summary input form (515) in FIG. 5 is viewable in browser (505) through GUI (510). Browser (505) may reference a specific URL pointing to the summary input form html document (e.g. https://www.pro-onlinetax.com/summary_input_form.html). The URL to the summary input form may be encoded and/or encrypted as a security precaution. The summary input form may be viewed in GUI (510), which may contain various UI elements. For example, the GUI may contain the summary input form, as well as other links such as "settings", "help", and "sign out."

In one or more embodiments of the invention, summary input form (515) may contain various elements, including page selection area (520), input area (525) including expandable tax items (530), and tax sub-items and input (535). Page selection area (520) may be an area of summary input form (515) that allows a user to select various portions of the summary input form (515), including an input portion, a review portion, and a file portion. The input portion may include the input area (525) expandable tax items (530), and tax sub-items and input (535), as demonstrated in FIG. 5. The review portion may allow a user to review input that he/she has entered into input area (525) in the input portion of summary input form (515). The file portion may allow a user to file with a tax authority the input that he/she has entered into input area (525) in the input portion of summary input form (515), and subsequently reviewed and approved in the review portion of summary input form (515).

In one or more embodiments of the invention, input area (525) includes expandable tax items (530) and tax sub-items and input (535). Expandable tax items (530) may include various tax categories pertinent to the tax filing of the user, that may be expanded and/or collapsed (e.g. one at a time, or all at once) as categories in summary input form (515). Examples of various tax categories in expandable tax items (530) may include client information, miscellaneous information, direct deposit, penalties and interests, wages, salaries, and tips, and interest income. Expandable tax items (530) may include tax sub-items and input (535). Tax sub-items are tax sub-categories that are organized and displayed according to the expandable tax items. For example, expandable tax item "direct deposit" may include tax sub-items including "name of financial institution", "routing transit number", "depositor account number", "type of account", and the like. Similarly, expandable tax item "penalties and interest" may include tax sub-items including "2008 tax liability". Likewise, expandable tax item "interest income" may include tax sub-items including "name of payer", "bank name", "account number", "type of account", and the like.

In one or more embodiments of the invention, inputs to the expandable tax items (530) and tax sub-items (535) may include various GUI elements that allow a user to provide input. For example, inputs (535) may include checkboxes, selections of numbers in selection boxes, entry of text in text boxes, selection of radio buttons, and various other user input mechanisms. For example, a user may fill out a text box next to the tax sub-item "2008 tax liability" under expandable tax item "penalties and interest" with "$1000" to indicate that he/she has $1000 of tax liability for 2008. Similarly, a user may check a checkbox next to the tax sub-item "direct deposit of federal refund" under the "direct deposit" tax item to indicate that he/she would like to receive a federal refund via direct deposit. Those skilled in the art will appreciate that there may be various UI elements used in input area (525) that have not been described. When a user has completed summary input form (515) (i.e. made selections for all elements in input area (525) that are pertinent to his/her tax filing), the user may then submit the summary input form by clicking on an "OK" button (e.g. in the bottom right hand corner of the summary input form). If the user wishes to review the answers provided in summary input form (515), then the user may click on the "review" link. Alternatively, if the user wishes to file the contents of summary input form (515) with or without review, then the user may click the "file" link.

In one or more embodiments of the invention, tax sub-items (535) may be edited by a user. For example, there may be an "edit" button on summary input form (515), that provides a user with the functionality to add and/or remove tax sub-items from the screen. The addition of new tax sub-items from the screen may be accomplished through, for example, the use of a popup screen that displays additional tax sub-items related to the expandable tax items currently in summary input form (515). Similarly, new expandable tax items may be added to summary input form (515) by selecting an "add form" button on summary input form (515). This selection may provide the user with a list of new tax categories not displayed on summary input form (515). The further selection of such tax categories may populate summary input form (515) with those new tax categories (i.e. expandable tax items), and the corresponding tax sub-categories (i.e. tax sub-items) related to those tax categories. Those skilled in the art will appreciate that there may be various means by which to edit summary input form (515).

In one or more embodiments of the invention, there may be links in GUI (510) and/or summary input form (515) providing further functionality for the user. For example, GUI (510) may include a link and/or button to access profiles of other clients besides the one currently associated with summary input form (515), with appropriate authorization. There may also be a button and/or link for editing details of the user and/or the summary input form and a link to a "live community" of other users that may provide help to the current user if he/she has questions regarding the completion of particular tax topics. There may also be an "about button", which may provide details about the particular version of summary input form (515), GUI (510), and application associated with them. Further, there may be search functionality provided to the user in the form of a search textbox and button, which may allow a user to search through summary input form (515) as well as the greater system for particular topics and/or keywords. Those skilled in the art will appreciate that there may be various other functions provided to a user to increase the efficiency and ease of use of the system.

FIG. 6 shows an example in accordance with one or more embodiments of the invention. The example shown in FIG. 6 may be used, for example, with system (100), to determine utilization levels for tax questions based on aggregate tax data. The elements shown in FIG. 6 may differ among embodiments of the invention, and one or more of the elements may be optional.

In one or more embodiments of the invention, FIG. 6 may demonstrate data used by system (100) to determine utilization levels. The data may represent details and/or statistics relating to tax forms and tax form data that is part of the aggregate tax data pool. The data may include various categories, including "series" (605), "code" (610), "number of hits" (615), "screen" (620), and "notes" (625). The "series" category (605) may indicate a tax form and/or tax question or portion of a screen associated with a particular tax form and/or tax question. The "code" category (610) may indicate an input on a screen associated with a particular series. For example, for a particular series (e.g. "11", or "wages"), a code of "800" may represent a text input box. Similarly, for a series of "2" (e.g. dependents), a code of "1000200006" may represent a numerical dropdown selection element. The "number of hits" category (615) may indicate the number of times a particular series (i.e. tax form and/or tax question) has been previously filed by users in system (100). This may be a total number of filings ever recorded by the system, or the number of filings performed for a certain year (e.g. 2009). The "screen" category (620) may identify what type of tax form and/or tax question the series indicates. For example, a series of "11" may be a "wages" screen. Similarly, a series of "64" may be a "vehicle expenses" screen. The "notes" category (625) may include notes associated with each series. For example, the series "11", associated with wages, may be associated with a notes describing that a tax return may have multiple W2 tax forms, therefore there may be more hits (e.g. 6015) than returns in a data set of 4337 returns.

In one or more embodiments of the invention, the number of hits of a series may be used to determine the utilization level for that series. For example, if, for a particular year (e.g. 2009), there were 4337 returns of various types filed, and there were 2968 tax forms (i.e. form B) associated with depreciation, the utilization rate (e.g. also known as utilization level, utilization percentage, utilization) of form B may be 68% (i.e. 2968/4337). Similarly, a series may represent a particular tax question in a particular tax form; for example, if there were a total of 1000 of a particular tax form (e.g. form C) filed in a particular year (e.g. 2009), and there were 450 of a particular tax question (e.g. question 5) completed and filed in form C by users that filed form C, the utilization rate of question 5 may be 45% (i.e. 450/1000). Each series may have a utilization threshold associated with it. For example, form B may have a utilization threshold of 50%, in which case if form B has a utilization level of 68%, then it may be included as a tax form (e.g. set of tax questions) in the summary input form. Similarly, question 5 may have a utilization threshold of 60%, in which case if question 5 has a utilization level of 45%, then it may not be included as a tax question in the summary input form. Therefore, a utilization threshold may be a pre-determined numerical amount and/or percentage, above which an associated utilization level is considered sufficient to include a related tax question and/or tax form in a summary input form, and below which an associated utilization level is considered insufficient to include a related tax question and/or tax form in a summary input form.

In one or more embodiments of the invention, those skilled in the art will appreciate that there may be conditional utilization levels. For example, even if a form has an general utilization level that is lower than a utilization threshold (e.g. a wages tax form with a utilization level of 50% across all tax filers in every state, and a utilization threshold of 65%), the tax form and the tax questions on it may be used in a summary input form if the conditional utilization level is higher than the utilization threshold (e.g. for all the tax filers in California that filed this tax form there is a utilization rate of 95%, which is greater than 65%). Those skilled in the art will appreciate that there may be numerous such scenarios in which utilization levels are conditional upon specific factors. Therefore, a conditional utilization level may be a pre-determined numerical amount and/or percentage associated with a specific condition. If the conditional utilization level is above an associated utilization threshold, then it may be considered sufficient to include a related tax question and/or tax form in a summary input form. If the conditional utilization level is below an associated utilization threshold, then it may be considered insufficient to include a related tax question and/or tax form in a summary input form.

Figure 7:
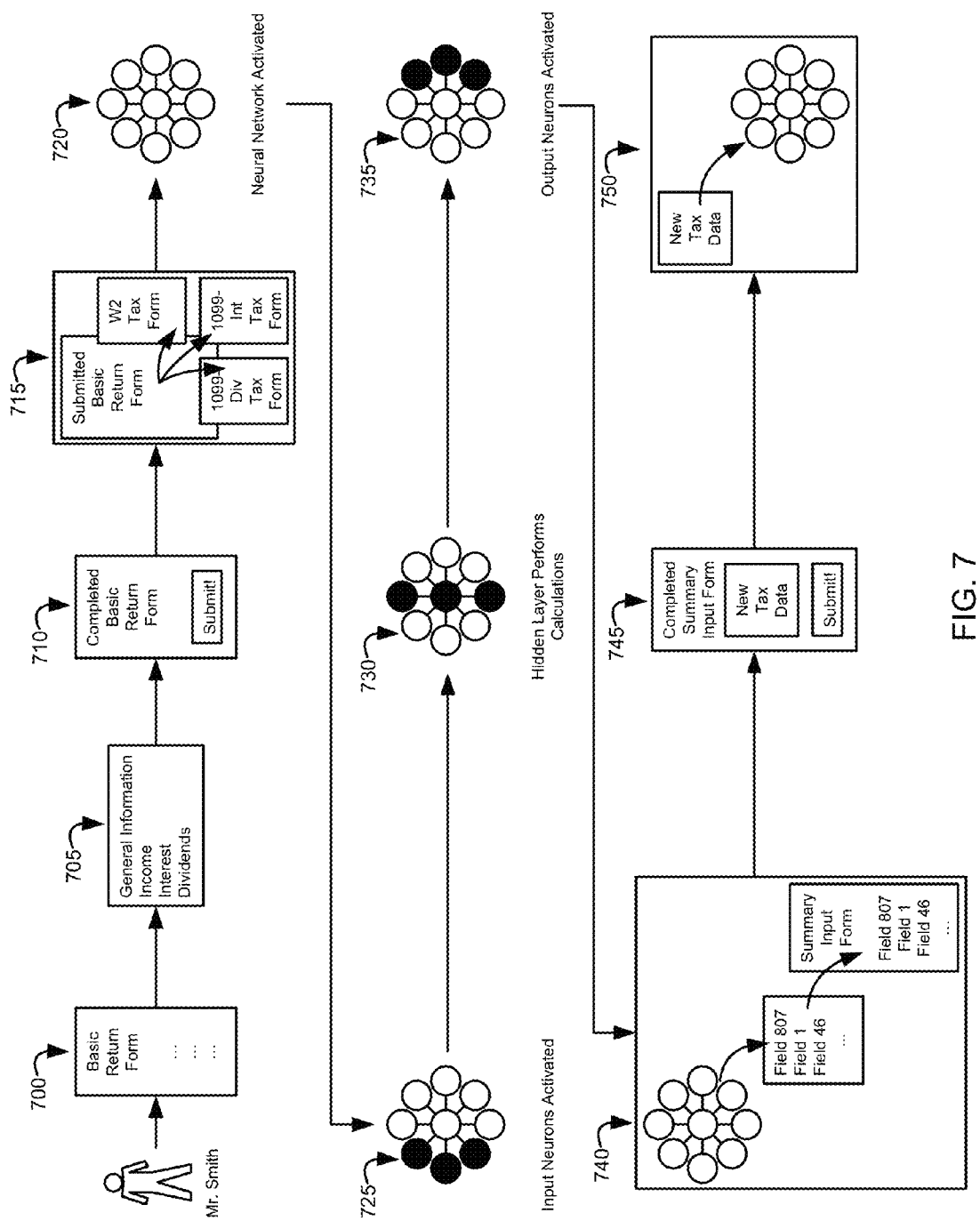

FIG. 7 shows an example in accordance with one or more embodiments of the invention. The example shown in FIG. 7 may be used, for example, with system (100), to utilize the functionality of a neural network to complete a tax form. The elements shown in FIG. 7 may differ among embodiments of the invention, and one or more of the elements may be optional.

In portion 700 of FIG. 7, Mr. Smith logs into Pro-Online Tax (POT) on his computer at his office, and begins to fill out a basic return form. Please refer to the description of STEPS 300 and 310 of FIG. 3 for more details regarding this portion of the process.

In portion 705, Mr. Smith makes selections in the basic return form regarding general information, income, deductions, and credits. Please refer to the description of STEP 315 of FIG. 3 for more details regarding this portion of the process.

In portion 710, Mr. Smith completes the basic return form. The basic return form may further be submitted by Mr. Smith, at which time it may be referred to as a submitted basic return form, and after which the information and/or data submitted by Mr. Smith may be processed by the system. Please refer to the description of STEP 335 of FIG. 3 for more details regarding this portion of the process.

In portion 715, tax forms relating to the submitted basic return form are identified, based on Mr. Smith's answers to the tax questions in the submitted basic return form. For example, because Mr. Smith submitted data relating to wages, dividends, and interest, the tax forms identified by the system may include W2, 1099-Div, and 1099-Int tax forms.

In portion 720, the neural network is activated with the W2, interest, and income tax forms. Activation of the neural network may include initialization. For example, the data store links of the neural network may be initialized (e.g. the link from the neural network to the aggregate tax data pool). Once the neural network has been activated, the input neurons may be activated.

In portion 725, the input neurons of the neural network are activated. The neurons in the input layer of the neural network may represent the W2, 1099-Int, and 1099-Div forms (e.g. and the tax questions they contain). Accordingly, the process of "seeding" the neural network with appropriate inputs (e.g. the W2, 1099-Int, and 1099-Div tax forms) takes place in the input layer of the neural network. These tax forms may be the tax forms that have been identified based on the submitted basic return form. Those skilled in the art will appreciate that there may be many ways to seed the input neurons with appropriate inputs.

In portion 730, the hidden layer of the neural network performs weighted matrix calculations on aggregate tax data using the data provided by the input neurons. For instance, given the input of the W2, 1099-Int, and 1099-Div tax forms, the hidden layer may perform calculations on the aggregate tax data that identify those tax forms and/or tax questions that have sufficient utilization levels to be included in the summary input form. For example, if a selection of tax questions (i.e. fields) of the W2, 1099-Int, and 1099-Div tax forms possess utilization levels that exceed their respective utilization thresholds, then that selection of tax questions (i.e. fields) may be included in the summary input form. In other words, the inputs provided by the input neurons of the neural network provide for an initial filter through which to select tax forms and tax questions from the aggregate tax data pool. Those skilled in the art will appreciate that there may be numerous other calculations performed by the hidden layer of the neural network.

In portion 735, the output neurons of the neural network are activated. The neurons in the output layer may represent fields of the W2, 1099-Int, and 1099-Div forms. These output neurons take the values of those tax forms and/or tax fields (i.e. questions) that were selected by the hidden layer of the neural network. Once the output layer of the neural network is activated, the fields may be selected for inclusion in the summary input form.

In portion 740, the neural network then selects the top fields that should be presented to Mr. Smith in the summary input form. For example, the tax field "wages for 2010" may be selected for inclusion in the summary input form, based on this question having a utilization level higher (e.g. 90%) than its utilization threshold (e.g. 75%). The selected fields may then be populated in the summary input form. The summary input form may then be presented to Mr. Smith, for him to complete.

In portion 745, Mr. Smith enters new tax data into the summary input form. The summary input form now reflects the most relevant fields for Mr. Smith's tax situation and the time of the tax season. Please refer to the description of STEP 365 of FIG. 3 for more details regarding this portion of the process.

In portion 750, Mr. Smith's tax data is added to the aggregate data pool of the neural network, for further use by the neural network in the future. Please refer to the description of STEP 375 of FIG. 3 for more details regarding this portion of the process.

Figure 8:
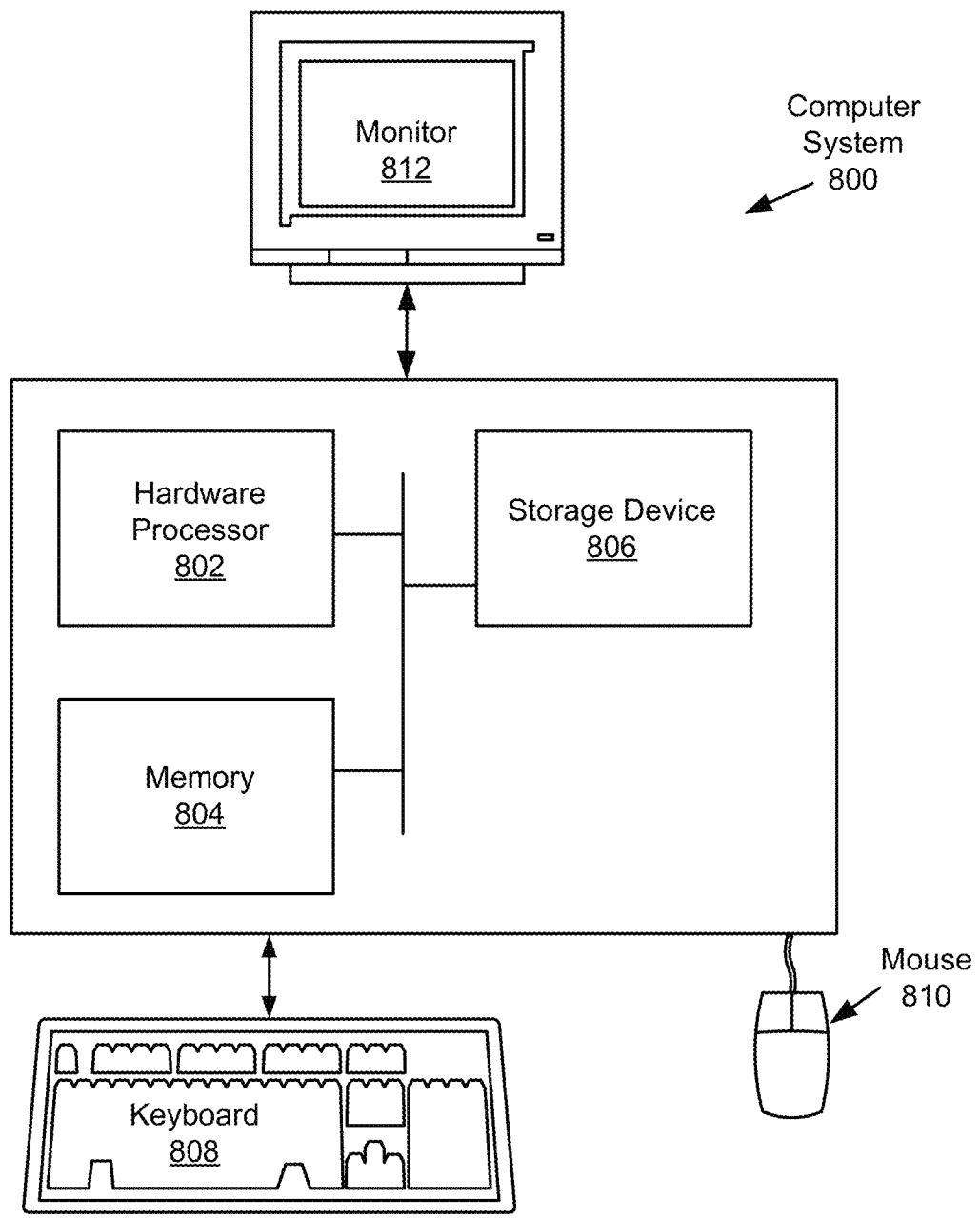
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more hardware processor(s) (802), associated memory (804) (e.g. random access memory (RAM), cache memory, flash memory, etc.), a storage device (806) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g. a liquid crystal display (LCD), a plasma display, or cathode ray tube (CRT) monitor). The computer system (800) may be connected to a network (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g. GUI engine (126), existing user data engine (127), basic return form engine (128), user input engine (129), extrapolation engine (130), neural network (131), summary input form (132), tax form completion engine (133), and tax form filing engine (134)) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for filing a tax form, comprising:

generating, by a computer processor, a basic return form comprising a plurality of basic return questions relating to the tax form;

receiving, by the computer processor, a plurality of basic return answers to the plurality of basic return questions from a user;

generating, by the computer processor, a first plurality of tax questions based on the plurality of basic return answers;

obtaining aggregate tax data from a plurality of filed tax returns based on the plurality of basic return answers;

determining a plurality of aggregate tax questions based on the aggregate tax data;

determining a plurality of utilization levels for the plurality of aggregate tax questions;

selecting a portion of the plurality of aggregate tax questions based on the plurality of utilization levels to generate a second plurality of tax questions;

generating, by the computer processor, a summary input form comprising the first plurality of tax questions and the second plurality of tax questions;

receiving, by the computer processor, a plurality of summary input answers to the first plurality of tax questions and the second plurality of tax questions from the user;

completing, by the computer processor, the tax form based on the plurality of summary input answers to obtain a completed tax form; and filing, by the computer processor, the completed tax form with a tax authority.

2. The method of claim 1, further comprising:
obtaining existing user data from a previously filed tax return of the user; and
generating the plurality of basic return questions based on the existing user data.

3. The method of claim 1, further comprising:
adding the completed tax form to the plurality of filed tax returns; and
adding at least one of the plurality of summary input answers to the aggregate tax data.

4. The method of claim 1, further comprising:
determining a number of tax returns previously filed comprising a tax question of the plurality of aggregate tax questions; and
generating a utilization level for the tax question based on the number of tax returns previously filed comprising the tax question of the plurality of aggregate tax questions.

5. The method of claim 1, further comprising:
determining a utilization level threshold;
identifying a portion of the plurality of utilization levels that exceed the utilization level threshold; and
selecting the portion of the plurality of aggregate tax questions based on the portion of the plurality of utilization levels that exceed the utilization level threshold to generate the second plurality of tax questions.

6. The method of claim 5, further comprising:
determining the utilization level threshold based on a tax return type; and
selecting the utilization level threshold.

7. The method of claim 1, further comprising:
generating a review form comprising the first plurality of tax questions, the second plurality of tax questions, and the plurality of summary input answers;
receiving a new answer to a question of the second plurality of tax questions in place of a previous answer; and
modifying the plurality of summary input answers to include the new answer in place of the previous answer.

8. The method of claim 1, further comprising:
identifying the plurality of utilization levels using a neural network, wherein the neural network comprises the aggregate tax data.

9. The method of claim 1, further comprising:
activating input neurons of a neural network based on the plurality of basic return answers;
calculating the plurality of utilization levels based on the input neurons;
activating output neurons of the neural network based on the plurality of utilization levels; and
generating the second plurality of tax questions based on the output neurons.

10. A system for filing a tax form, comprising:
a hardware processor;
a basic return form engine executing on the hardware processor and configured to:
generate a basic return form comprising a plurality of basic return questions relating to the tax form;
a user input engine executing on the hardware processor and configured to:
receive a plurality of basic return answers to the plurality of basic return questions from a user; and
receive a plurality of summary input answers to a first plurality of tax questions and a second plurality of tax questions from the user;
an extrapolation engine executing on the hardware processor and configured to:
generate the first plurality of tax questions based on the plurality of basic return answers;
a neural network configured to:
obtain aggregate tax data from a plurality of filed tax returns based on the plurality of basic return answers;
determine a plurality of aggregate tax questions based on the aggregate tax data;
determine a plurality of utilization levels for the plurality of aggregate tax questions; and
select a portion of the plurality of aggregate tax questions based on the plurality of utilization levels to generate the second plurality of tax questions;
a summary input form engine executing on the hardware processor and configured to generate a summary input form comprising the first plurality of tax questions and the second plurality of tax questions;
a tax form completion engine executing on the hardware processor and configured to complete the tax form based on the plurality of summary input answers to obtain a completed tax form; and
a tax form filing engine executing on the hardware processor and configured to file the completed tax form with a tax authority.

11. The system of claim 10, wherein the basic return form engine is further configured to:
obtain existing user data from a previously filed tax return of the user; and
generate the plurality of basic return questions based on the existing user data.

12. The system of claim 10, wherein the neural network is further configured to:
add the completed tax form to the plurality of filed tax returns; and
add at least one of the plurality of summary input answers to the aggregate tax data.

13. The system of claim 10, wherein the neural network is further configured to:
determine a number of tax returns previously filed comprising a tax question of the plurality of aggregate tax questions; and
generate a utilization level for the tax question based on the number of tax returns previously filed comprising the tax question of the plurality of aggregate tax questions.

14. The system of claim 10, wherein the neural network is further configured to:
determine a utilization level threshold;
identify a portion of the plurality of utilization levels that exceed the utilization level threshold; and
select the portion of the plurality of aggregate tax questions based on the portion of the plurality of utilization levels that exceed the utilization level threshold to generate the second plurality of tax questions.

15. The system of claim 10, wherein the summary input form engine is further configured to:
generate a review form comprising the first plurality of tax questions, the second plurality of tax questions, and the plurality of summary input answers;
receive a new answer to a question of the second plurality of tax questions in place of a previous answer; and
modify the plurality of summary input answers to include the new answer in place of the previous answer.

16. The system of claim 10, wherein the neural network is further configured to:
identify the plurality of utilization levels based on a plurality of neurons, wherein the neural network comprises the plurality of neurons and the aggregate tax data.

17. The system of claim 10, wherein the neural network is further configured to:
- activate input neurons of the neural network based on the plurality of basic return answers;
- calculate the plurality of utilization levels based on the input neurons;
- activate output neurons of the neural network based on the plurality of utilization levels; and
- generate the second plurality of tax questions based on the output neurons.

18. A non-transitory computer readable storage medium storing instruction for filing a tax form, the instructions executable on a hardware processor and comprising functionality for:
- generating a basic return form comprising a plurality of basic return questions relating to the tax form;
- receiving a plurality of basic return answers to the plurality of basic return questions from a user;
- generating a first plurality of tax questions based on the plurality of basic return answers;
- obtaining aggregate tax data from a plurality of filed tax returns based on the plurality of basic return answers;
- determining a plurality of aggregate tax questions based on the aggregate tax data;
- determining a plurality of utilization levels for the plurality of aggregate tax questions;
- selecting a portion of the plurality of aggregate tax questions based on the plurality of utilization levels to generate a second plurality of tax questions;
- generating a summary input form comprising the first plurality of tax questions and the second plurality of tax questions;
- receiving a plurality of summary input answers to the first plurality of tax questions and the second plurality of tax questions from the user;
- completing the tax form based on the plurality of summary input answers to obtain a completed tax form; and
- filing the completed tax form with a tax authority.

19. The non-transitory computer readable storage medium of claim 18, the instructions further comprising functionality for:
- obtaining existing user data from a previously filed tax return of the user; and
- generating the plurality of basic return questions based on the existing user data.

20. The non-transitory computer readable storage medium of claim 18, the instructions further comprising functionality for:
- adding the completed tax form to the plurality of filed tax returns; and
- adding at least one of the plurality of summary input answers to the aggregate tax data.

21. The non-transitory computer readable storage medium of claim 18, the instructions further comprising functionality for:
- determining a number of tax returns previously filed comprising a tax question of the plurality of aggregate tax questions; and
- generating a utilization level for the tax question based on the number of tax returns previously filed comprising the tax question of the plurality of aggregate tax questions.

22. The non-transitory computer readable storage medium of claim 18, the instructions further comprising functionality for:
- determining a utilization level threshold;
- identifying a portion of the plurality of utilization levels that exceed the utilization level threshold; and
- selecting the portion of the plurality of aggregate tax questions based on the portion of the plurality of utilization levels that exceed the utilization level threshold to generate the second plurality of tax questions.

23. The non-transitory computer readable storage medium of claim 18, the instructions further comprising functionality for:
- generating a review form comprising the first plurality of tax questions, the second plurality of tax questions, and the plurality of summary input answers;
- receiving a new answer to a question of the second plurality of tax questions in place of a previous answer; and
- modifying the plurality of summary input answers to include the new answer in place of the previous answer.

24. The non-transitory computer readable storage medium of claim 18, the instructions further comprising functionality for:
- identifying the plurality of utilization levels using a neural network, wherein the neural network comprises the aggregate tax data.

25. The non-transitory computer readable storage medium of claim 18, the instructions further comprising functionality for:
- activating input neurons of a neural network based on the plurality of basic return answers;
- calculating the plurality of utilization levels based on the input neurons;
- activating output neurons of the neural network based on the plurality of utilization levels; and
- generating the second plurality of tax questions based on the output neurons.

* * * * *